United States Patent
Castle et al.

(10) Patent No.: US 8,125,288 B2
(45) Date of Patent: Feb. 28, 2012

(54) METHOD FOR MODULATING A SIGNAL

(75) Inventors: Robert John Castle, Bristol (GB); John Waters, Bath (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 1349 days.

(21) Appl. No.: 11/737,519

(22) Filed: Apr. 19, 2007

(65) Prior Publication Data

US 2007/0248188 A1 Oct. 25, 2007

(30) Foreign Application Priority Data

Apr. 19, 2006 (GB) .................................. 0607671.5

(51) Int. Cl.
*H03C 1/50* (2006.01)
*H03C 3/38* (2006.01)
*H04B 7/00* (2006.01)
*H04Q 5/22* (2006.01)

(52) U.S. Cl. ....... 332/151; 332/120; 332/145; 340/10.1; 340/10.3; 340/10.34; 340/10.51; 455/102; 455/108; 455/523

(58) Field of Classification Search .................. 332/120, 332/145, 151; 340/10.1, 10.3, 10.34, 10.5, 340/10.51; 375/219, 320; 455/102, 108, 455/523

See application file for complete search history.

(56) References Cited

U.S. PATENT DOCUMENTS

| | | | | |
|---|---|---|---|---|
| 6,459,726 B1 * | 10/2002 | Ovard et al. | ................... | 375/219 |
| 6,549,078 B1 * | 4/2003 | Sridharan et al. | ............... | 331/17 |
| 6,784,785 B1 | 8/2004 | Wuidart et al. | | |
| 2002/0015436 A1 | 2/2002 | Ovard et al. | | |
| 2003/0040289 A1 | 2/2003 | Collin et al. | | |
| 2004/0246101 A1 * | 12/2004 | Cole | ........................... | 340/10.1 |
| 2004/0246102 A1 * | 12/2004 | Jaakkola et al. | ............. | 340/10.4 |
| 2005/0058292 A1 | 3/2005 | Diorio et al. | | |
| 2010/0321126 A1 * | 12/2010 | Castle | .......................... | 332/145 |

FOREIGN PATENT DOCUMENTS

| | | |
|---|---|---|
| EP | 1672804 A1 | 6/2006 |
| WO | 99/56414 | 11/1999 |
| WO | 03/036807 A1 | 5/2003 |
| WO | 03/062861 A1 | 7/2003 |

OTHER PUBLICATIONS

Search Report in co-pending PCT application No. PCT/EP2007/053864, dated Oct. 22, 2008.

* cited by examiner

*Primary Examiner* — Levi Gannon (57) ABSTRACT

A method for modulating a signal transmitted by a first device to a second device which is energised by the signal, wherein the first device is further arranged to amplitude modulate the signal so as to transmit data thereon, the method further comprising phase modulating the signal.

17 Claims, 12 Drawing Sheets

METHOD FOR MODULATING A SIGNAL

RELATED APPLICATIONS

The present application is based on, and claims priority from, United Kingdom Application Number 0607671.5, filed Apr. 19, 2006, the disclosure of which is hereby incorporated by reference herein in its entirety.

FIELD OF THE INVENTION

The present invention relates generally to a method of and apparatus for modulating a carrier to provide both power and data transmission to a device irradiated by the carrier.

SUMMARY OF THE PRESENT INVENTION

According to a first aspect of the present invention there is provided a method for modulating a signal transmitted by a first device to a second device which is energised by the signal, wherein the first device is further arranged to amplitude modulate the signal so as to transmit data thereon, the method further comprising phase or frequency modulating the signal.

It is thus possible to provide a transmission scheme which adds a phase modulation to an amplitude modulation signal such that the phase modulation spreads the transmitted signal in the frequency domain and reduces the peak in the power spectral density of the transmitted signal compared to an equivalent signal in which no phase modulation has been applied.

According to a second aspect of the present invention there is provided a method of spreading an amplitude modulated signal so as to reduce the magnitude of a peak in the power spectral density of the signal, the method comprising superimposing a phase or frequency modulation onto the AM signal.

According to a third aspect of the present invention there is provided a transmitter for irradiating a passive device so as to deliver power to the device in order to power it up, wherein a phase or frequency modulation is applied to the signal transmitted by the transmitter.

According to a fourth aspect of the present invention there is provided a reader for use with a device that is energised by a transmission from the reader and which transmits data to the reader characterised in that the transmission from the reader occurs over a spread frequency range and that the reader includes a corrector for applying a correction to the received signal to correct for frequency related amplitude changes resulting from the transmission over a spread frequency range.

According to a fifth aspect of the present invention there is provided a method of correcting for amplitude changes in a communications system comprising: a first device for storing data and adapted to transmit it to a reader when energised by an electromagnetic energy field transmitted by the reader; and a reader; wherein, in use, the reader is arranged to apply a frequency spreading modulation to the electromagnetic energy transmitted by the reader, and is further arranged to measure or estimate amplitude changes in a signal conveying data from the first device resulting form the use of the frequency spreading modulation.

BRIEF DESCRIPTION OF THE DRAWINGS

The present invention will further be described, by way of non-limiting example only, with reference to the accompanying Figures, in which.

DETAILED DESCRIPTION

Devices such as RF ID tags or memory spots are known or proposed whereby some memory, optionally some data processing facility and a transmitter/receiver are integrated into a single device, usually a silicon chip. The device does not include an onboard power supply and instead is adapted to be irradiated, for example by radio frequency energy, and to extract sufficient energy from the irradiating signal to power the device up such that it can perform its task. A problem for such devices is that they must receive sufficient energy from the reader/writer device irradiating them that they can function whilst simultaneously there is a desire for these devices to be as inexpensive as possible such that they may be extensively deployed without incurring significant cost.

The radio frequency spectrum is becoming an increasingly congested resource. Therefore the possibility of mutual interference from different systems co-existing within the same physical region can become a real and significant problem. One of the measures used to evaluate an RF transmission is power spectral density, PSD, which refers to the bandwidth over which the signal power from a transmitter is distributed. In general, a transmission with a high power spectral density is more likely to cause interference to other users and devices than a transmission with a low power spectral density. Systems of the type described hereinbefore that use radio frequency transmissions to provide power to passive devices, such as RF ID and memory spot devices, are prone to having a high peak power spectral density because when they are transferring power (without data) to receive a response from the device that they are irradiating, then the transmission is effectively just a single tone. Thus all of the power is concentrated into a very narrow bandwidth and the peak power spectral density can become relatively high. Furthermore, it is also the case that when transferring data from the irradiating device to the passive device the peak power spectral density may still be high because the desire to implement low cost receivers within the passive devices means that AM receivers are used. Furthermore, the requirement to transmit power at all times means that low index amplitude modulation schemes are used.

Figure 8:
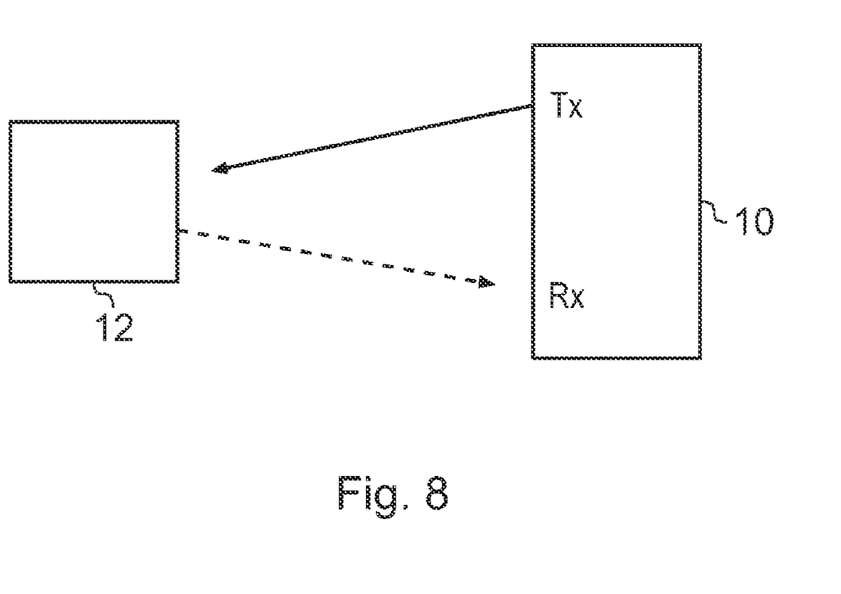
FIG. 8 schematically illustrates a terminal and passive device, wherein the passive device is irradiated by the terminal and derives its power from the transmitted energy.

A reader/writer terminal 10 in conjunction with a memory spot device 12 is schematically shown in FIG. 8. The reader/writer includes a transmitter so as to irradiate the memory spot device 12. The reader/writer 10 also includes a receiver for receiving any transmissions from the memory spot device 12.

Figure 1:
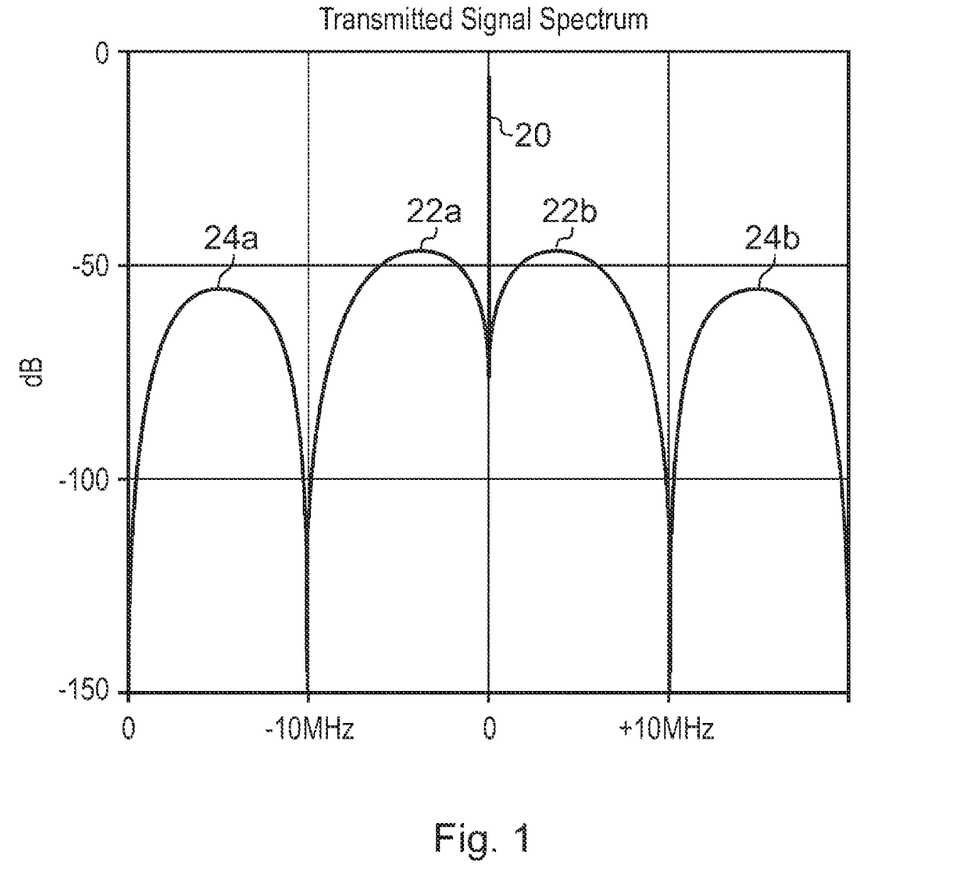
FIG. 1 schematically illustrates the power spectral density of an amplitude modulated signal used to transmit a Manchester encoded data stream and power from a terminal to a device such as an RF ID tag, memory spot or near field communications device which derives its power from the transmitted signal.

As noted hereinbefore, the current modulator/demodulator used in reader/writer units for memory spot, RF ID tags and other passive computing devices (being passive in the sense that they have no onboard power and must receive their power from the signal irradiating them) can result in a transmitted signal having a high peak power spectral density that has the potential to cause interference with other users. The reader/writer units, out of economic convenience, are often arranged to work in frequency bands which have been designated for general use. Therefore, for example, the reader/writer unit for memory spot operates in the 2.4 GHz band. This band is also shared by other users, such as WiFi networks. The transmission scheme is amplitude modulation with a low modulation index, with the result that the transmission has many of the characteristics of an unmodulated RF carrier. FIG. 1 schematically illustrates a plot of the power spectral density of the signal transmitted by the reader/writer unit 10 of FIG. 8 when transmitting a Manchester encoded data stream. It can be seen that the majority of the power is located in a central peak 20. Side lobes 22a, 22b, 24a and 24b extend in symmetrical manner around the central peak 20. Assuming, for example, that the data transmission rate is 10 MBs$^{-1}$ (megabits a second) then it can be seen that the peaks in the side lobes 22a and 22b occur approximately 3.8 MHz away from the central peak 20 and that nulls occur 10 MHz away from the central peak.

It can be seen that the maximum amplitude of the side lobes 22a and 22b are approximately 40 dB lower than the height of the central peak 20. This means that the overwhelming majority of the signal power is concentrated in the spectral tone due to the carrier. The bandwidth of the carrier is very narrow, so when transmitting a signal of the power required to make the memory spot chip function, the peak power spectral density is very high.

It would be possible to reduce the peak power spectral density by reducing the transmitted power. However this has the problem that the power available to the passive device becomes reduced and it is therefore likely that it would cease to function. Alternatively, more complex modulation schemes could be used which have better power spectral density characteristics. However these are economically unsatisfactory as the existing amplitude modulation scheme used by RF ID tag and memory spot devices is a very good solution to the dual requirements of transferring both power and data to a chip in the manner which uses the minimum amount of silicon area on the chip (which relates directly to the cost thereof) and which also avoids complex and power hungry receiver circuitry. Therefore any change in the modulation scheme away from simple amplitude modulation is likely to have a direct and negative impact on both the price and performance of the system as a whole.

The inventors have realised that it is possible to modify the modulation scheme used in readers/writers for such passive systems so as to reduce the power spectral density transmitted thereby without impacting on the performance of the simple amplitude modulation receiver used within the passive device itself.

Figure 2:
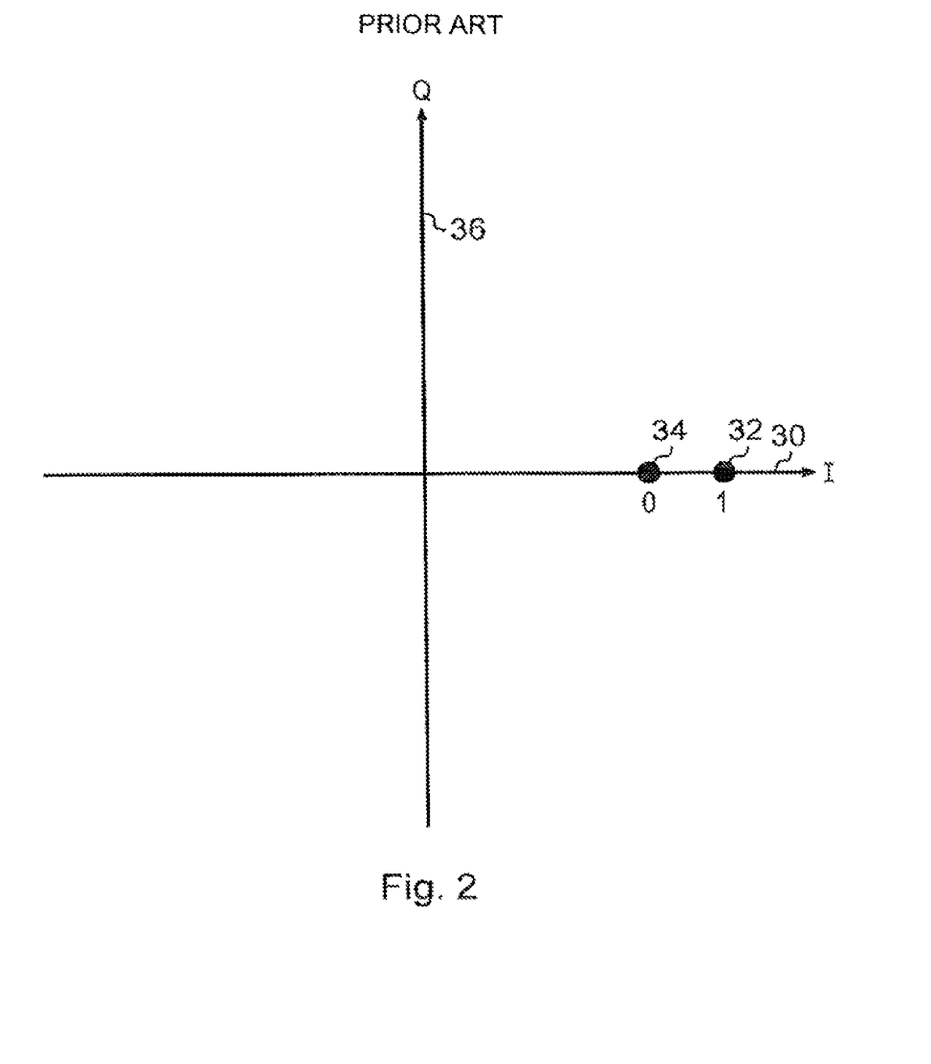
FIG. 2 schematically illustrates a low index modulation, amplitude modulation scheme for use in transmitting data to such a passive device which derives its power from the signal irradiating it.

FIG. 2 schematically shows a phasor diagram representing the prior art modulation scheme used for memory spot devices and the like. Given that no phase modulation occurs in a conventional amplitude modulation scheme, then for simplicity the modulation can be represented as lying along the real (in-phase) axis 30 of the phasor diagram. Furthermore, as a low modulation index is used, then the variation in the transmitted power is relatively small. In this example, a "1" is transmitted with a first power, as indicated 32 on FIG. 2, and the "0" is located with a second power level, in this case a reduced power level, designated 34 in FIG. 2. If the index of modulation is relatively low, for example 20% or less, then it can be intuitively seen that most of the transmitted power is effectively an unmodulated signal. In fact, we can also tell intuitively that the average transmitted power will lie somewhere between the values for the "1" and the "0".

The inventors have realised that the phase insensitivity of an amplitude modulation detector can be exploited so as to allow a phase modulation to be imposed on the transmitted signal such that values corresponding to a "1" and a "0" occur on both sides of the quadrature axis 36. It can then intuitively be seen that the average of the modulation signal can be reduced below that of the "0" and in fact can be bought close to a position at the origin of the phasor diagram.

Figure 3:
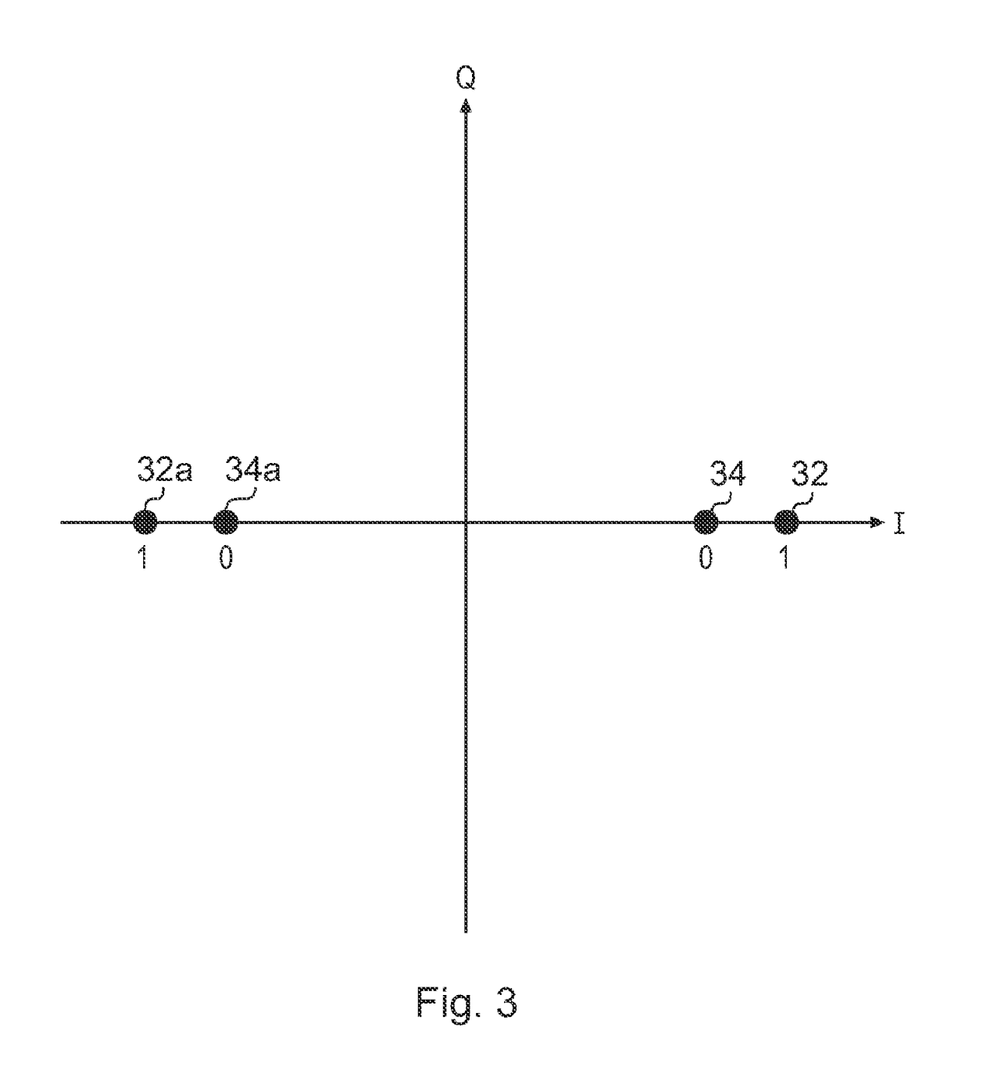
FIG. 3 schematically illustrates a modulation scheme constituting an embodiment of the present invention.

Such a modified transmission scheme is shown in FIG. 3. Here two values corresponding to a "1" exist, namely the value designated 32 as shown in FIG. 2 and a corresponding value 32a having the same magnitude but the opposite phase such that it occurs on the negative side of the in-phase axis in the phasor diagram. Similarly the value corresponding to the zero 34 has a complimentary value 34a having the same magnitude but a 180° phase shift such that it occurs on the negative side of the in-phase axis in the phasor diagram. It can therefore be seen that, in amplitude terms, the greater amplitude always corresponds to a "1" and the lesser amplitude always corresponds to "0" so that a receiver that only demodulates the amplitude component of the signal and which ignores the phase will not be affected by whether the transmitted constellation point is on the positive or negative side of the origin. Thus, for such a receiver, constellation point 32a is identical to constellation point 32.

Tests by the inventors on a memory spot modulator/demodulator confirm that the modification to the transmission scheme described with respect to FIG. 3 has no impact on the ability of the modulator/demodulator within the memory spot to receive data correctly.

As part of the modulation scheme a determination has to be made as to whether to use the in-phase constellation points, 32 and 34, or the anti-phase constellation points 32a and 34a to transmit the data. This choice can advantageously be made from a random data source, such as a random number generator, which is uncorrelated with the data which is being transmitted. Thus a "1" bit from the random number generator might correspond to use of the in-phase set and a "0" from the random number generator might correspond to use of the anti-phase set. However the opposite mapping could equally be used. It is, however, important to ensure that both pairs of constellation points are used substantially equally in order to obtain a zero DC condition and also to ensure that there are no strong patterns or correlations which might themselves produce unwanted spectral components. These conditions are generally satisfied by the use of a pseudo-random binary sequence which, in trials, has been found to work satisfactorily.

In practice, instantaneous changes of the amplitude and phase cannot be achieved. Therefore the signal cannot instantaneously hop between the points 32, 34, 34a and 32a. It therefore has to follow a trajectory from one point to the next. Furthermore, it is not desirable for the signal amplitude to merely traverse along the in-phase axis between, for example, point 32a and point 34 as in so doing the signal would pass through both point 34a which might lead to transmission of corrupt data and also through the origin thereby creating a signal with a very large (100%) modulation index. Large modulation indexes are not desirable as they interfere with the transfer of power from the reader/writer to the passive device. It would be possible for the passive device to be modified to enable it to cope more easily with a higher modulation index, but this would generally need the inclusion of a significantly larger smoothing capacitor within the device in order to mitigate the ripple introduced into its power supply by the much larger index of modulation, and this would take up more area on the silicon substrate of the passive device thereby increasing its cost.

Figure 4:
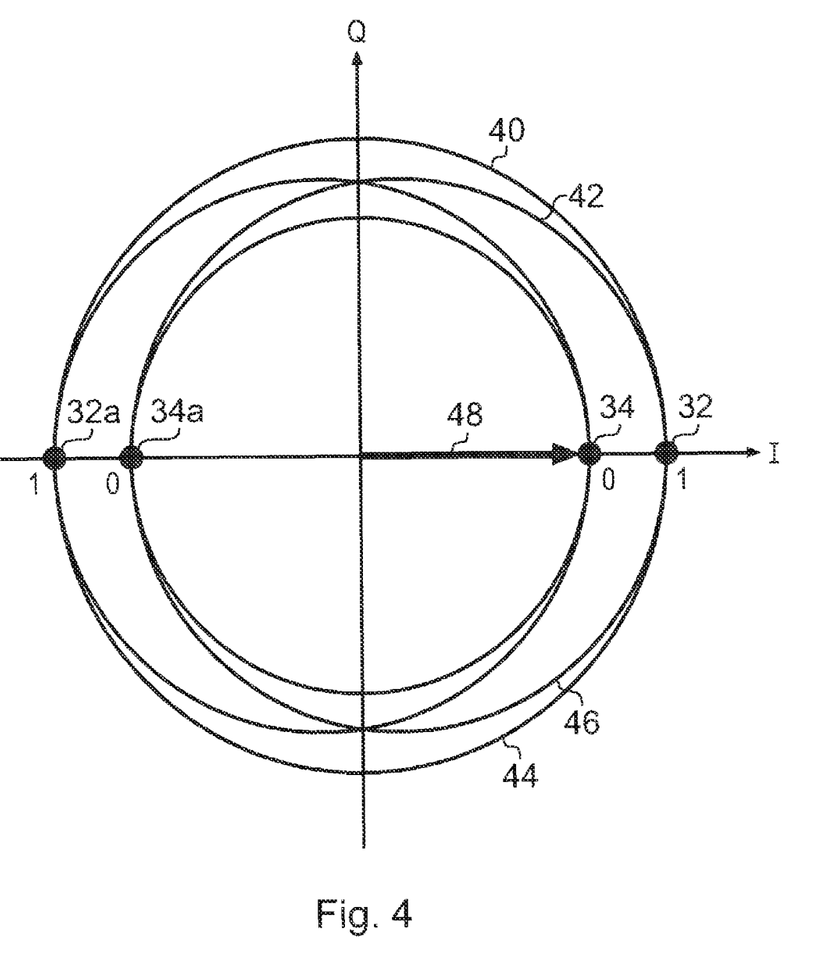
FIG. 4 schematically illustrates on a phasor diagram transitions within the modulation scheme shown in FIG. 3.

A better solution is a trajectory (which is implemented as a phase modulation) which substantially maintains the amplitude between that of the zero bit and one bit levels but which rotates the phase of the modulation signal around the constellation (phasor) diagram through substantially 180° to change between the in-phase and anti-phase sets of constellation points. Such a trajectory is schematically shown in FIG. 4. Starting at point 32, it can be seen that anti-clockwise rotation around the phasor diagram can be used to follow trajectories 40 or 42 to constellation points 32a or 34a, respectively. However from point 32 it can also be seen that rotation in the clockwise direction can be used such that trajectories 44 and 46 may be followed to the anti-phase constellation points 32a and 34a respectively. Similar trajectory paths exist from the constellation point 34 to the constellation points 32a and 34a, but have not been numbered so as to improve the clarity of the Figure. It can therefore be seen that, during the transition period from, for example, constellation point 32 to constellation point 32a, the magnitude of the transmitted signal remains substantially invariant and hence ripple is not introduced into the power supply of the passive device. It is, of course, necessary to modify the reader/writer unit in order to be able to transmit a signal in accordance with the constellation diagrams shown in FIGS. 3 and 4 and hence it is necessary to be able to modulate the phase of the signal to introduce phase changes into the transmitted signal. This could be achieved using a quadrature modulator fed by appropriate in-phase and quadrature phase signals. Indeed, the scheme is in principle extendable to large numbers of constellation points, as long as one set lie on a circle have a radius representing a "0" and the other set lie on a circle having a radius representing a "1". I-Q modulators are especially suited for encoding schemes having lots of constellation points. However, the transmission scheme can also be introduced by a relatively simple modification of the AM modulators already embedded in the reader/writer units for use with the passive devices. This modification is particularly suited to schemes having low numbers of constellation points. Such reader/writer units already include an amplitude modulator and a frequency synthesiser in order to generate the RF carrier. So all that is needed is to add phase modulation. However, since frequency and phase are closely related and in fact frequency is the rate of change of phase, then the phase component of the modulation signal can be differentiated and this differentiated signal applied to a voltage controlled oscillator input as a frequency modulation to achieve the same result.

Figure 5:
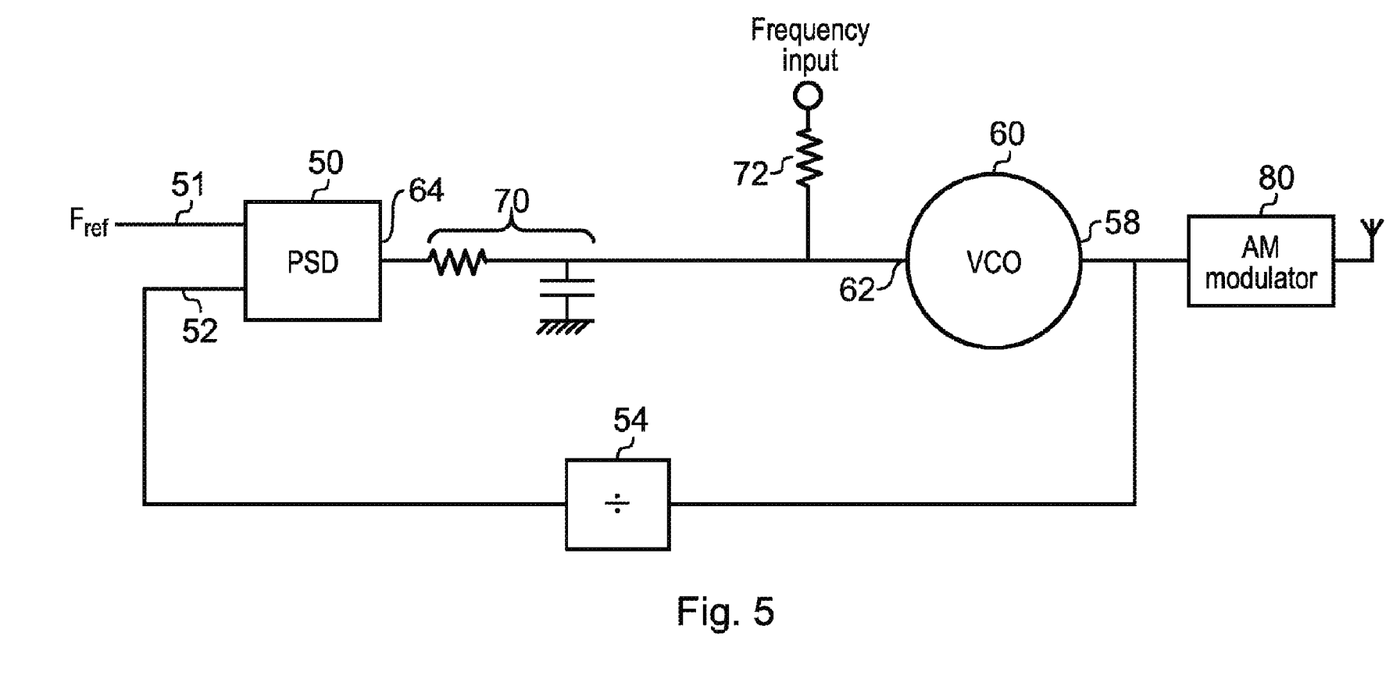
FIG. 5 schematically shows a modulator arranged to work in accordance with the present invention.

FIG. 5 schematically shows a modulator within a reader/writer unit which has been modified in order to enable a phase variation to be superimposed upon the amplitude modulated signal. The phase lock loop comprises a phase sensitive detector 50 which has a first input 51 which receives a frequency reference signal from a stable frequency source, such as a crystal controlled oscillator. The phase sensitive detector 50 also has a second input 52 which receives an output from a frequency divider 54 which in turn has its input connected to the output 58 of a voltage controlled oscillator 60. The voltage controlled oscillator has an input 62 which is connected to the output 64 of the phase sensitive detector 50 via a filter network generally designated 70. In use, the frequency output of the voltage controlled oscillator is divided down by the frequency divider 54 by divide ratio N supplied to the phase sensitive detector 50. The action of the phase sensitive detector is to try and match the frequencies and phases of the signals occurring at its inputs 51 and 52 and it produces a voltage output which is indicative of the error between the phases of the signals at its inputs. This error is low pass filtered in order to derive a control voltage for the voltage controlled oscillator therefore, providing the phase lock loop is appropriately designed, it will act so as to set the output frequency of the voltage controlled oscillator to be N times the frequency of the reference frequency. Given that the reference frequency is highly frequency stable, then the output frequency of the voltage controlled oscillator 60 can also be made to be relatively stable in frequency and well defined in frequency. The output of the oscillator is then provided to an amplitude modulator 80.

In order to allow the phase shift to be added to the signal, a further connection is made to the input of the voltage controlled oscillator, via a resistor 72 such that a further control voltage can be superimposed onto the oscillator input. Providing an appropriate conversion gain is applied then this further control signal can be used to make small perturbations to the voltage controlled oscillator's frequency output so as to introduce appropriate phase modulation to the oscillator output signal.

Given that the amplitude and phase components of the modulation signal are treated independently, and are effectively uncorrelated, it is worth considering in little more detail how they are generated. The amplitude component is generally straight forward, a digital data signal that is to be transmitted is simply filtered and DC shifted such that its mean signal level is the mean level between the two amplitudes in the constellation diagram.

As regards the phase component, we may assume that the modulation vector starts at an angle of zero degrees (that is lies along the positive axis of the in-phase component of the constellation diagram), and then one or more bits later swings with either a positive or a negative rotation through 180°. After a further one or more bits it swings back again preferably taking a reverse rotation to that which previously happened, such that it effectively retraces its path. Therefore, returning to FIG. 4, if a first phase rotation is anti-clockwise such that the modulation vector 48 follows the paths 40 or 42 into the anti-phase section of the phasor diagram, then the phase rotation will be a clockwise one so as to return the vector back to the in-phase section. Thus, the modulation vector does not travel through a complete 360° in any given direction of rotation.

The behaviour of the modulation vector can be produced from a random bit stream by using duo binary encoding. A circuit suitable for generating such a phase change signal using duo binary encoding is schematically illustrated in FIG. 6.

A pseudo random binary signal generator 81 is used to generate a pseudo random binary sequence in response to timing signals from a clock 82. The pseudo random binary sequence is sent to a first adding input of an adder 84. The pseudo random binary sequence is also provided to a delay element 83 which introduces a delay of one or more clock pulses. The output of the delay element 83 is provided to a second adding input of the adder 84. Given that, in broad terms, the output of the binary random number generator 80 could either take a zero or a one then it can be seen that the output of the adder 84 can take the values zero, one or two. An output of the adder 84 is provided to an input of a second adder 86 which receives an offset signal for an offset generator 88, the offset corresponding in this example to a value of −1 such that the output of the adder 86 can take the values −1, zero or +1. These output values may, or may not, be low pass filtered and are then supplied to the input of the VCO via the resistor 72. Apart from the optional low pass filtering, if the phase signal is to be used with the VCO in a frequency modulation implementation, then it should be differentiated to convert the phase modulation to an equivalent frequency modulation. The size of the resistor 72 is selected, based on a knowledge of the transfer characteristics of the voltage controlled oscillator 60 so as to set an appropriate gain between the output of the adder 86 and the input of the voltage controlled oscillator 60 such that a desired phase of 180° is substantially achieved over the duration of one bit period of the duo-binary output signal at the output of the adder 86.

In general, over-sampling is employed. In a preferred implementation of the basic scheme shown in FIG. 6 eight times over-sampling is used. Thus, if the phase modulation signal changes at a rate of 10 MHz, then the clock runs at a rate of 80 MHz and the delay element corresponds to 8 clock periods' duration. The over-sampling has the advantage of making the phase modulation pulses look more like square pulses than the triangular peaks that would result from using a single sample per bit.

Figure 6:
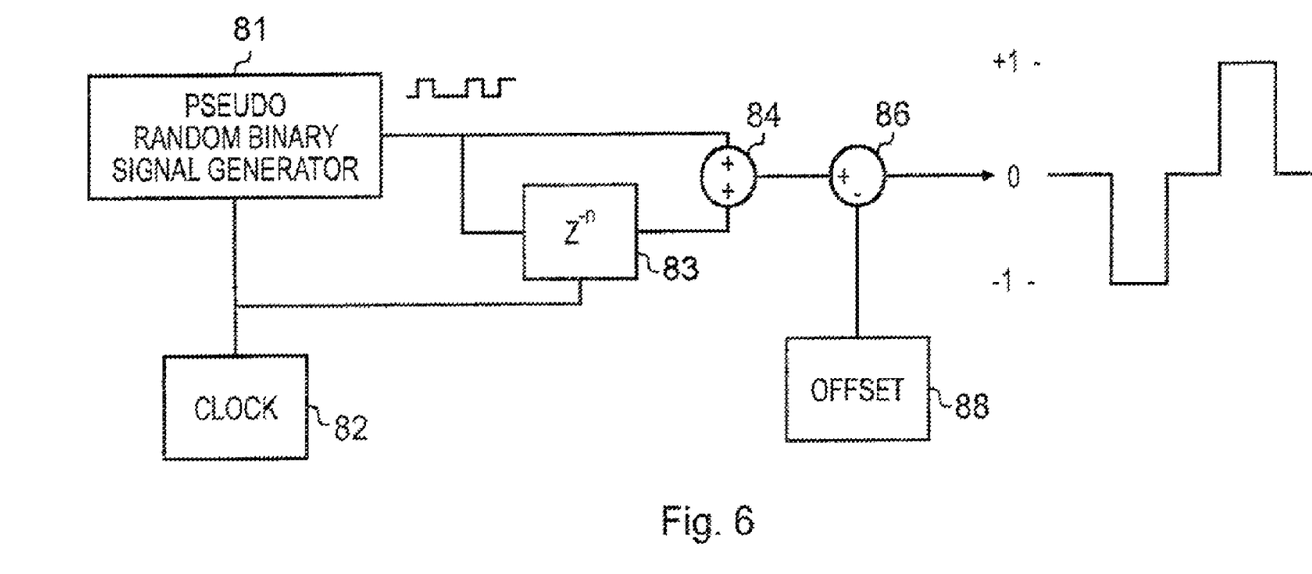
FIG. 6 schematically illustrates an apparatus for generating the phase control signal.
Figure 7:
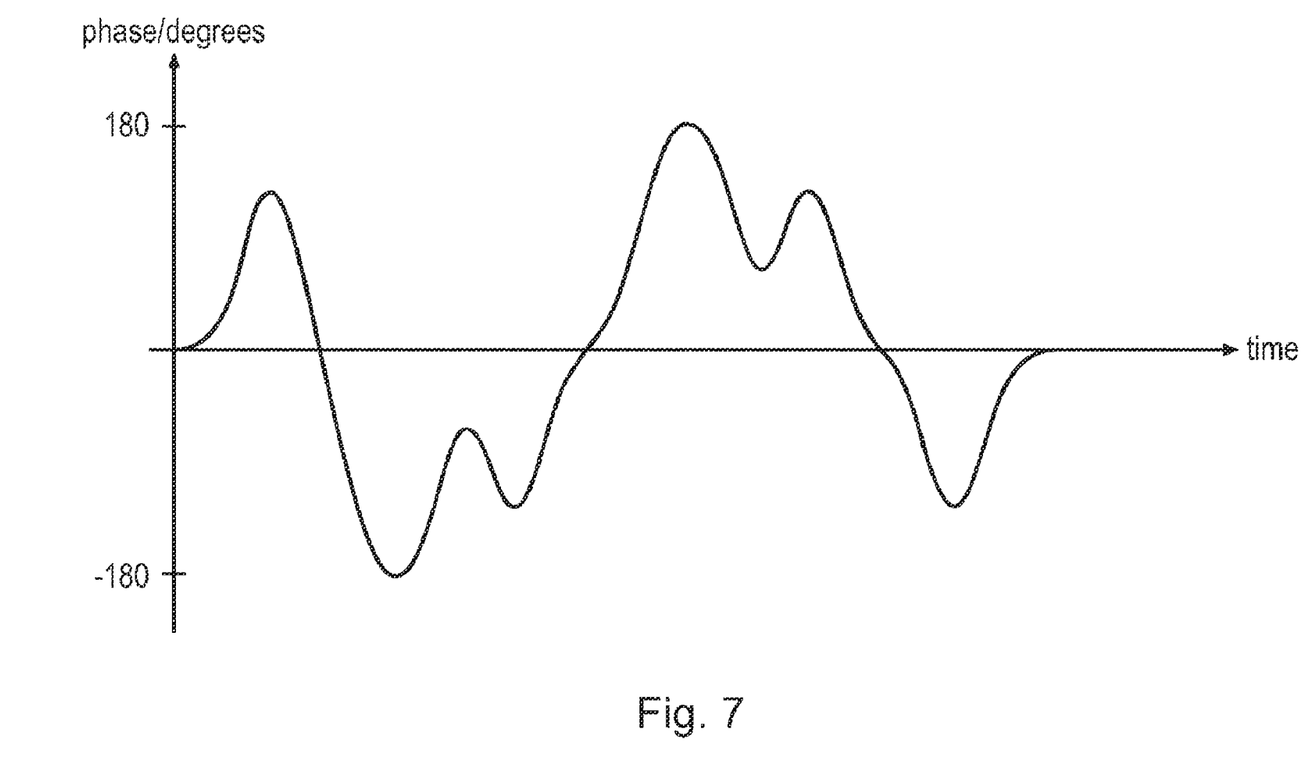
FIG. 7 schematically illustrates an example of a phase modulation signal supplied to a modulator adapted to work in accordance with the present invention.

FIG. 7 schematically illustrates the change in phase with respect to time that may, for example, be achieved as a result of a bit stream generated by the arrangement shown in FIG. 6. It could be seen that, due to the low pass filtering, a change in direction of rotation of the modulation vector may be initiated before the full phase change between zero and 180° has been achieved. Nevertheless, this does not adversely affect the operation of the modulator as the phase rotations are roughly symmetrical and this allows a zero mean value of phase vector to be achieved in projections extending along both the I and Q directions of the phasor diagram (and indeed any other arbitrary line of projection).

The modulation scheme and trajectories described herein can be modified such that other constellation points, for example lying off the real axis of the phasor diagram may also be included and different and more complex trajectories linking constellation points may be used. However to obtain the full benefits of the present invention, the designer of the schemes should be careful to make sure that the average of the constellation points, as projected along any straight line passing through the origin of the phasor diagram should have a zero or substantially zero value.

Figure 9A:
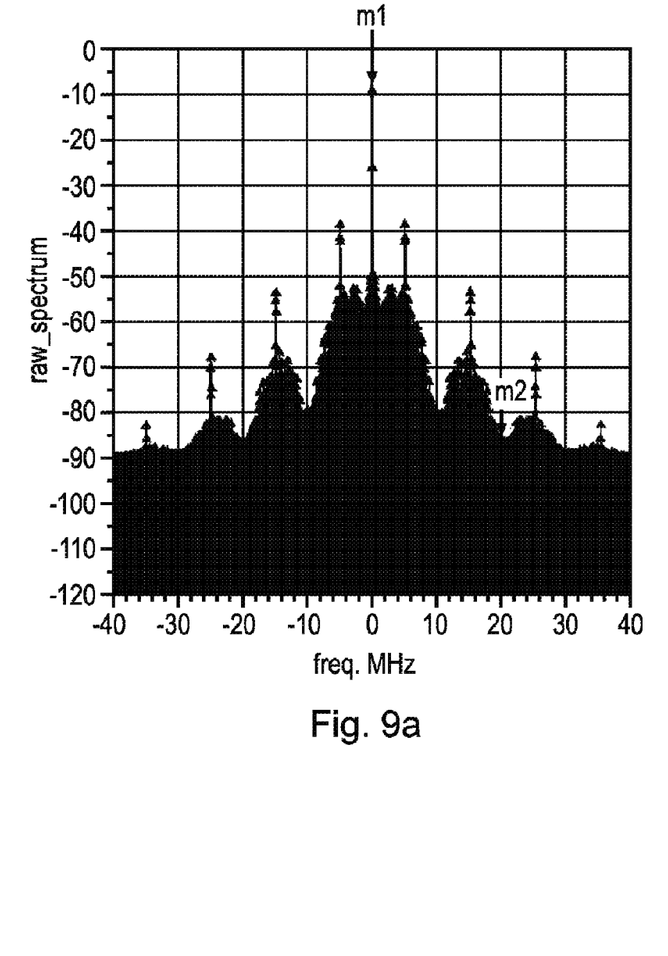
FIGS. 9a and 9b compare power spectral density when the phase shift is off and on, respectively.
Figure 9B:
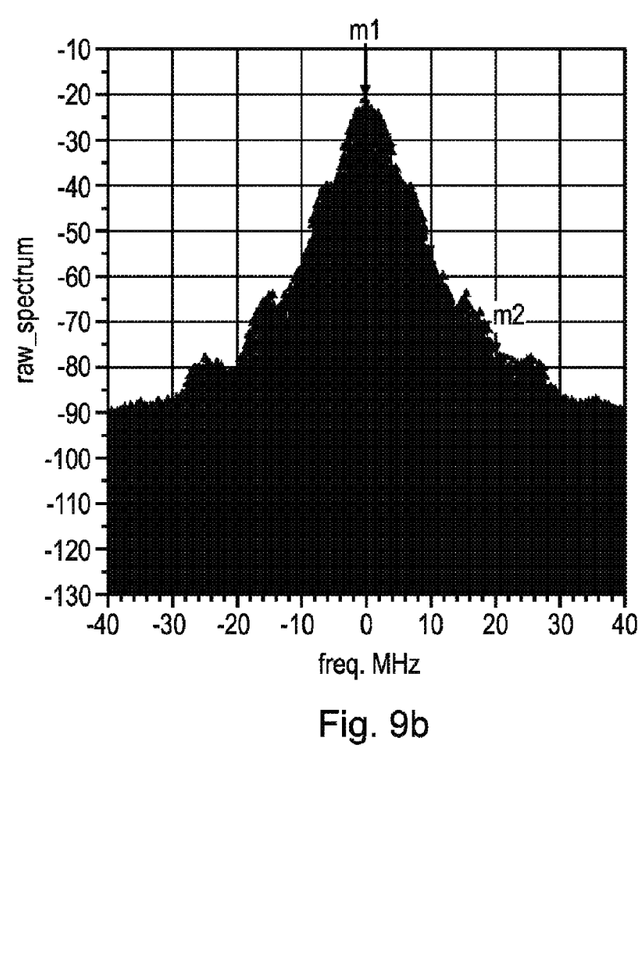

FIGS. 9a and 9b compare the power spectral density of identical signals transmitted by identical transmitters but where FIG. 9a does not include phase modulation in accordance with the present invention, but where the transmission shown in FIG. 9b includes phase modulation in accordance with the present invention. It can be seen that the peak transmitted power is reduced by approximately 13 dB. This reduces the likelihood of interference with other devices without requiring any modification of the receiver architecture within the memory spot, RF ID or other passive device.

Figure 10:
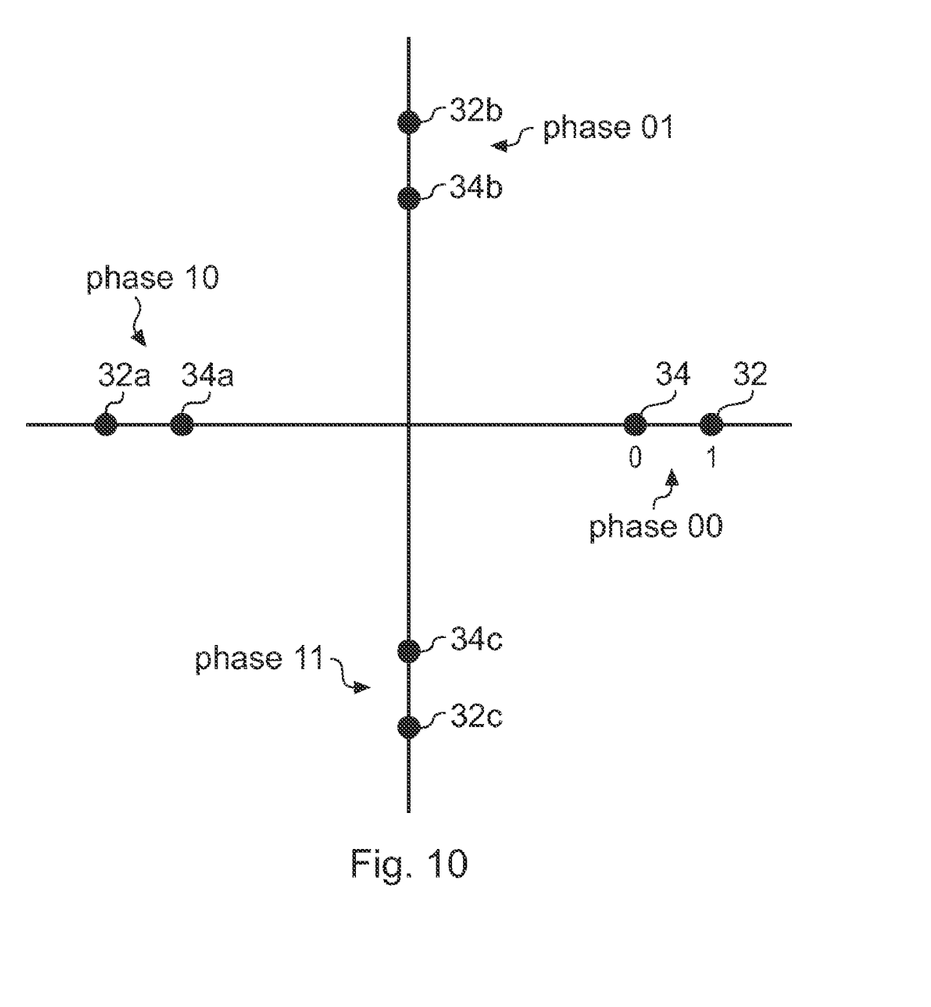
FIG. 10 shows a further modulation scheme in accordance with the present invention.

FIG. 10 schematically illustrates a further variation to the modulation scheme shown in FIG. 4, where constellation points within the phasor diagram also exist on the imaginary axis. As before, the constellation points corresponding to a zero, 34, 34a, 34b and 34c have a reduced amplitude compared to those constellation points corresponding to a one, namely 32, 32a, 32b and 32c. In one embodiment the transitions may only ever be limited to ±90° increments, this can be realised by a coding scheme which examines each bit, one at a time, from a random number generator and where the bit determines the direction of rotation around the phasor diagram. Therefore, starting at phase 00, if the next bit is a "1" then a jump is made to phase 01 otherwise a jump is made to phase 11. A similar jump decision in an anticlockwise or clockwise direction depending on the nature of the bit can be made from all other phasors, 00, 01, 10 and 11 as shown in FIG. 10. An alternative scheme is to use an accumulator where, for example, zero equals a +90° jump and one equals a −90° jump and the running sum can therefore be accumulated to control the motion around the constellation diagram in 90° increments (or indeed in increments of any other arbitrary size). Two bit control schemes may also be used where for example, a first one of the bits controls the direction of rotation thus a zero may correspond to an anticlockwise rotation within the phasor diagram whereas a one may correspond to a clockwise rotation, and the second bit controls the size of the jump whereas zero may correspond to a jump having a magnitude of 90° and a one corresponds to a jump having a magnitude of 180°. It is thus possible to superimpose a phase modulation onto the amplitude modulation signal so as to spread the spectrum of the signal thereby reducing its power spectral density.

Compensating for Amplitude Changes Due to Narrow-Band Coupling of a Spread Spectrum Signal.

In the discussion so far, it has been assumed that adding the phase modulation—which inherently introduces frequency shifts in the VCO output as frequency is the rate of change of phase—did not introduce any unwanted amplitude changes into the transmitted AM signal.

Whilst no amplitude changes are intended as a result of the frequency spreading modulation, unintended amplitude changes can occur.

In use, the tuned circuit contained within the receiver of the memory spot device couples with the transmitter via the intermediate RF field. This coupling gives rise to a band-pass response. Consequently, the coupled signal strength of a first signal, designated $F_1$ in FIG. 11, and a second signal having the same amplitude as the first signal but a different frequency $F_2$ can differ at the receiver by virtue of $F_2$ lying in a region 102 of a response curve 100 where received amplitude varies strongly as a function of frequency.

This effect is only of real significance when seeking to read data from the memory spot device.

One option is to simply do nothing and live with the fact that some unintended amplitude modulation occurs. The unintended modulation may not be significant enough to adversely affect the bit error rate on recovery of data from the memory spot device. Furthermore, schemes for coding data are known which provide resilience against bit errors.

It is worth considering the interaction between the transmitter and the irradiated device a little more closely.

Figures 11, 12:
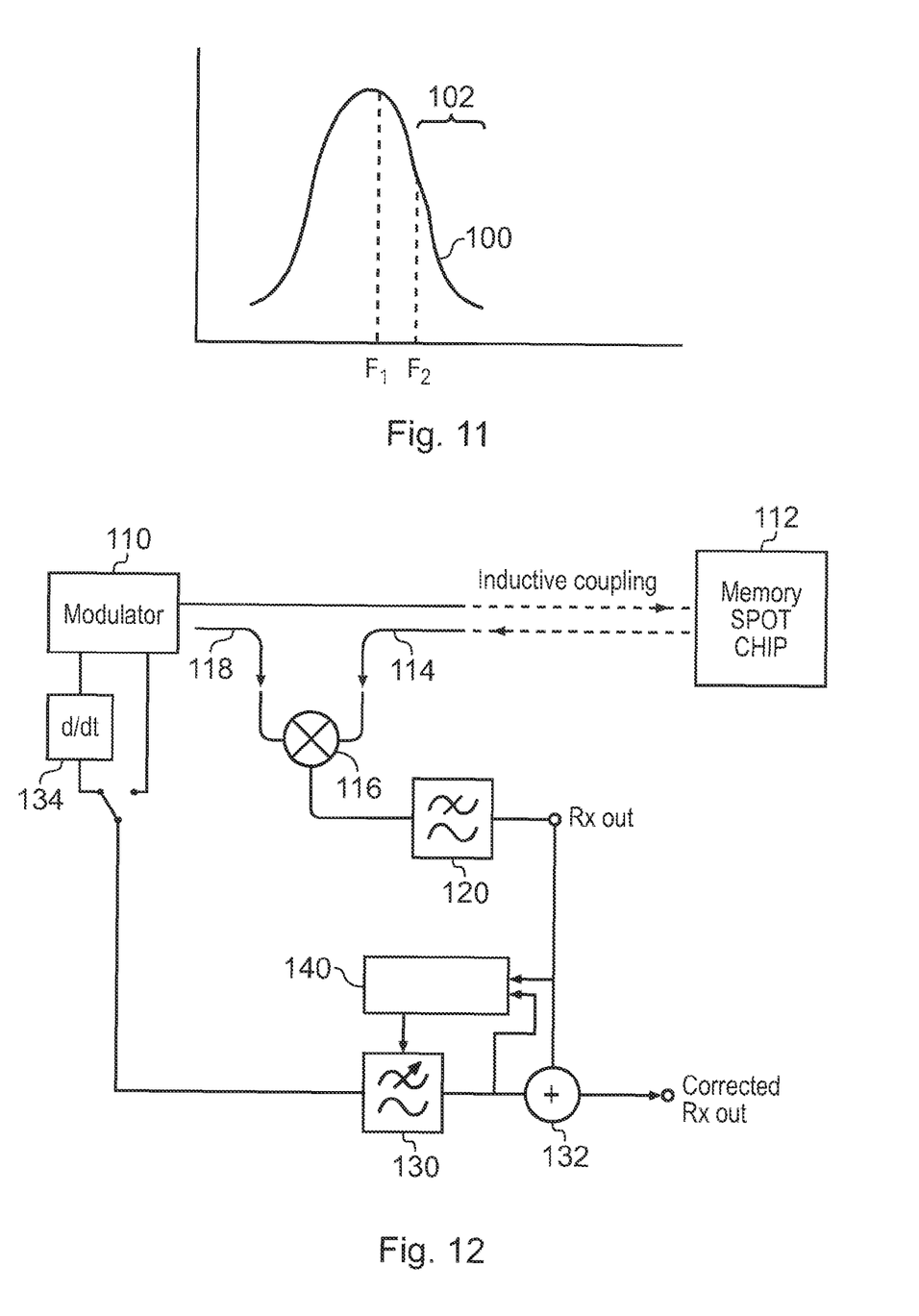
FIG. 11 is a diagram illustrating how a frequency change can give rise to an amplitude change.
FIG. 12 is a schematic diagram of a reader/writer unit.

FIG. 12 shows an arrangement in which a modulator 110, for example of the type shown in FIG. 5 is used to irradiate a memory spot device 112. The transmitter and the memory spot become coupled together via the RF or inductive coupling. The memory spot device also sends its data back by effectively varying the coupling between itself and the transmitter, so that a phase of a signal reflected back to the transmitter conveys data from the memory spot chip.

In order to recover data transmitted from the memory spot chip 112 a directional coupler is used to preferentially direct the reflected signal to a first input of a multiplier 116. A representation of the transmitted signal, either derived directly from the modulator or, as shown in FIG. 12, derived by a second directional coupler 118 is supplied to a second input of the multiplier 116. An output of the multiplier is low pass filtered by a filter 120 to recover the base band signal at node "Rx out".

The signal at node Rx out contains changes in amplitude due to changes in the phase of the signal reflected from the memory spot chip together with unwanted variations in amplitude due to frequency related changes in the coupling between the modulator 110 and the memory spot chip 112.

In use, the reader unit transmits a phase modulated spread signal to the chip and simultaneously receives a reflected version of that signal from the chip, together with a data dependent phase variation. By multiplying these two signals together at the multiplier 116, the only changes in amplitude that occur at the output of the multiplier 116 should be due to the phase variations introduced by the chip 112. Consequently data can be recovered from this signal. In the absence of the spreading phase and modulation this is indeed the case, but when the phase modulation is present there is an additional amplitude variation that interferes with the recovered data. This additional amplitude variation closely matches the FM signal used to cause the spreading (the derivative or time differential of the phase modulation signal). If the modulator shown in FIG. 5 is being used, then this FM signal is readily available as it corresponds to the signal applied to the frequency input on resistor 72. However due to the filtering effects of the system, and especially the filter 120 of FIG. 12, the amplitude variation does not exactly match the FM signal in terms of the relative timing and precise shape of the waveform. There is also an amplitude mismatch. However it is possible to compensate for these differences by observing the Rx out signal that results from a known signal such as from the period before the chip responds (for example period 150 in FIG. 13). Because the chip is doing nothing at this time, the reflected signal does not contain data dependent variations, and the recovered base band signal Rx out should simply be a constant flat signal. Any observed amplitude variations must therefore be due to the spreading modulation. It then becomes possible to construct a filter 130 that modifies the FM signal to more precisely match the unwanted amplitude variation. This can then be subtracted from the demodulator signal by an adder 132 so as to leave a corrected data signal.

The filter 130 may have its input connected to the modulator directly or via a differentiator 134. This choice depends on the implementation of the modulator. Thus, if the modulator is controlled by a frequency modulation—applied for example to the frequency input terminal of resistor 72 in FIG. 5, then a direct connection of the input of the filter 132 to this frequency input terminal is appropriate.

A filter controller 140 can be provided to compare the recovered base band signal Rx out and the output of the filter 130, and can form a feedback loop for adjusting filter parameters, such as gain, frequency response, phase response, delay and pulse response characteristics so as to derive a signal that matches (at least in part) the unwanted amplitude variation such that it can be subtracted from the recovered signal by the adder/subtractor 132.

The reader can also be adapted to write data to the memory spot device, and the term reader should be construed to cover a device that can also write to the chip.

Figure 13:
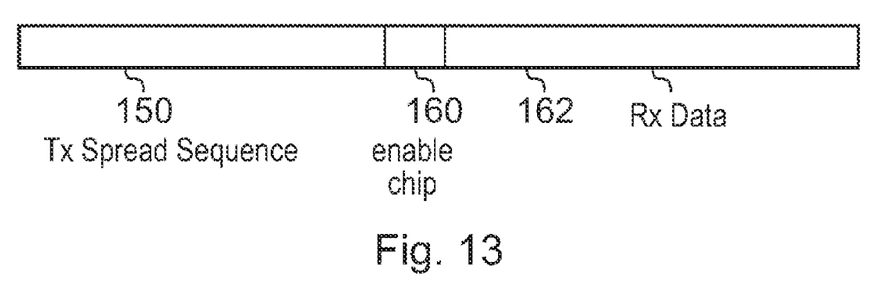
FIG. 13 shows a first characterisation scheme.

As an alternative to hardware modification, corrections may be made with a data processor connected to the receiver. In one scheme, as illustrated in FIG. 13, the frequency spreading sequence may be transmitted to the memory spot while the memory spot device is instructed to not transmit data back. This occurs in time frame 150 shown in FIG. 13. A data processor responsive to the receiver can then store the amplitude changes that result from the use of the spreading sequence. Alternatively, the complete signal that appears at the RX output (following filter 120 of FIG. 12) could be stored whilst a spreading sequence is being transmitted in the period 150. In the absence of the spreading phase modulation this should be a constant signal, but once the spreading modulation is applied it will contain amplitude variations that are characteristic of the spreading modulation and the particular coupling conditions occurring at that time between the reader and the memory spot chip. A signal 160 is then sent to the chip to enable it to send its data during transmission of a second spread sequence 162 which was identical to the first one 150. The signal received during the first spreading sequence can be subtracted from the signal received during the second sequence 162 to recover the transmitted data.

Figure 14:
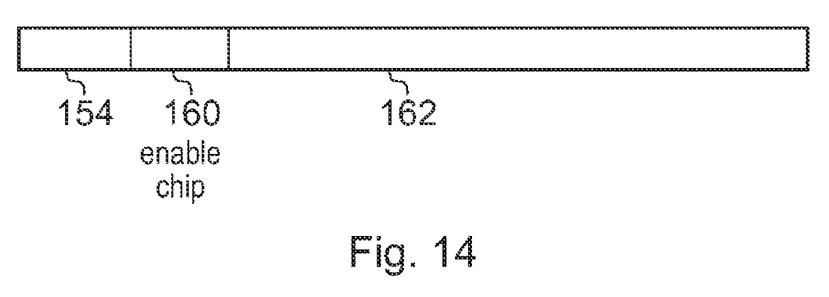
FIG. 14 shows a second characterisation scheme.

In a variation on the theme, shown in FIG. 14, the first spreading sequence transmission could be replaced with a short interrogation sequence 154 where the various constellation transitions are transmitted and the resulting reflected signal recorded so as to enable the coupling effects to be characterised. The coupling (or amplitude) effects during 162 can then be estimated based on knowledge of the frequency spreading sequence transmitted by the reader/writer unit 10 and the characterisation measured during 154.

A further variation works in essentially the same way as that shown in FIG. 13 but the receive data period 162 simply uses a series of repeats of a shorter version of the sequence 150. This has the advantage that the time frame 150 can be significantly shorter than the data receive period 162. The use of a shorter spreading sequence has been found to be sufficient for introducing spreading and does not produce unsuitable spectral lines when repeated several times during the data receive period 162. However there is a trade off between the length of the sequence 150 and the introduction of additional spectral lines, and the ratio of the length of the characterisation period 150 compared to the data receive period 162 can be selected by the system designer based on considerations of implementational convenience of the system against spectral performance.

It is thus possible to provide an enhanced method and apparatus for illuminating passive devices in order to power them up such that they can return data to a reader unit.

The invention claimed is:

1. A method for modulating a signal transmitted by a first device to a second device which is energised by the signal, wherein the first device is further arranged to amplitude modulate the signal so as to transmit data thereon, the method further comprising phase or frequency modulating the signal to a random or pseudorandom phase frequency, wherein modulating the signal includes matching a frequency and a phase of a number of inputs at a phase sensitive detector, wherein the second device is further arranged to filter the signal via a filter and a filter control that form a feedback loop to adjust a corrector.

2. A method as claimed in claim 1, where phase modulation is applied and the phase shifts are selected such that a target phase shift magnitude is substantially greater than or equal to $$\frac{\pi}{2}$$

radians.

3. A method as claimed in claim 1, where phase modulation is applied and a target phase shift magnitude is $\pi$ radians.

4. A method as claimed in claim 1, where phase modulation is applied and the phase shifts can occur in one of a first direction and a second direction opposed to the first direction, and the phase shifts are arranged that a substantially equal number of shifts occur in the first and second directions.

5. A method as claimed in claim 4, wherein, when the phase of the signal is represented on a phasor diagram and a first vector on the phasor diagram represents a carrier signal with no phase shift applied, then the modulation scheme is arranged such that a phase shift in a first direction away from the direction of the first vector is followed by a phase shift in the second direction.

6. A method as claimed in claim 5, in which a period of time where no changes to the phase are made may be interposed between the phase shift in the first direction and the phase shift in the second direction.

7. A method as claimed in claim 5, wherein the modulation scheme is further arranged such that a phase shift in the second direction away from the first vector is followed by a phase shift in the first direction.

8. A method as claimed in claim 7, in which a period of time when no changes to the phase are made may be interposed between the phase shift in the second direction and the phase shift in the first direction.

9. A method as claimed in claim 1, in which when the modulation carrier is represented by a vector on a phasor diagram, the phase shifts applied to the carrier are such that an average value of a component of the vector projected onto an arbitrary line in the phasor diagram passing through the origin is substantially zero or small compared to the length of the vector.

10. A transmitter for irradiating a passive device so as to deliver power to the device in order to power it up, wherein a random or pseudorandom phase frequency modulation is applied to the signal transmitted by the transmitter, the transmitter arranged to amplitude modulate the signal and match a frequency and a phase of a number of inputs at a phase sensitive detector, the passive device arranged to filter the signal via a filter and a filter control that form a feedback loop to adjust a corrector.

11. A transmitter as claimed in claim 10, in which a low index of modulation is used.

12. A transmitter as claimed in claim 10, in which, when the signal is represented on a phasor diagram, a vector sum of the instantaneous vectors during transmission is substantially at the origin of the phasor diagram.

13. A transmitter as claimed in, claim 10, further including an arrangement for applying a perturbation to the input voltage of a voltage controlled oscillator so as to introduce phase shifts into the output signal from the voltage controlled oscillator.

14. A reader for use with a device that is energised by a transmission from the reader, the transmission having a random or pseudorandom phase frequency modulation applied to the transmission by the reader, and which transmits data to the reader characterised in that the transmission from the reader occurs over a spread frequency range and that the reader includes a corrector for applying a correction to the received signal to correct for frequency related amplitude changes resulting from the transmission over a spread frequency range, the reader further includes a filter and a filter control to form a feedback loop to adjust the corrector.

15. A reader as claimed in claim 14, in which the amplitude of a demodulated signal during a phase or frequency modulated transmission is monitored, and a signal derived therefrom applied to a demodulated data stream received from the device so as to correct for amplitude variations resulting from the phase or frequency modulation.

16. A reader as claimed in claim 14, in which the reader transmits a spreading sequence to characterise or record the amplitude changes in which the spreading sequence is shorter than a data receive period.

17. A reader as claimed in claim 14, wherein the reader can write data to the device.

* * * * *

UNITED STATES PATENT AND TRADEMARK OFFICE
CERTIFICATE OF CORRECTION

| | | |
|---|---|---|
| PATENT NO. | : 8,125,288 B2 | Page 1 of 1 |
| APPLICATION NO. | : 11/737519 | |
| DATED | : February 28, 2012 | |
| INVENTOR(S) | : Robert John Castle et al. | |

It is certified that error appears in the above-identified patent and that said Letters Patent is hereby corrected as shown below:

IN THE CLAIMS:

In column 12, line 14, in Claim 13, delete "in," and insert -- in --, therefor.

Signed and Sealed this
Sixth Day of November, 2012

David J. Kappos
*Director of the United States Patent and Trademark Office*